United States Patent [19]
Sarrade et al.

[11] Patent Number: 5,961,835
[45] Date of Patent: Oct. 5, 1999

[54] PROCESS AND INSTALLATION FOR THE SEPARATION OF HEAVY AND LIGHT COMPOUNDS BY EXTRACTION USING A SUPERCRITICAL FLUID AND NANOFILTRATION

[75] Inventors: Stéphane Sarrade, Orange; Maurice Carles; Christian Perre, both of Pierrelatte; Paul Vignet, Orange, all of France

[73] Assignee: Commissariat a L'Energie Atomique, France

[21] Appl. No.: 08/849,541
[22] PCT Filed: Dec. 11, 1995
[86] PCT No.: PCT/FR95/01638
§ 371 Date: Jun. 10, 1997
§ 102(e) Date: Jun. 10, 1997
[87] PCT Pub. No.: WO96/18445
PCT Pub. Date: Jun. 20, 1996

[30] Foreign Application Priority Data

Dec. 12, 1994 [FR] France ............................ 94 14923

[51] Int. Cl.$^6$ .................................................. B01D 61/00
[52] U.S. Cl. ........................ 210/652; 210/634; 210/651; 210/653
[58] Field of Search ..................... 210/644, 652, 210/651, 653, 634; 426/417

[56] References Cited

U.S. PATENT DOCUMENTS

| | | | |
|---|---|---|---|
| 4,749,522 | 6/1988 | Kamarei | 260/412.8 |
| 4,879,114 | 11/1989 | Catsimpoolas et al. | 424/95 |
| 5,160,044 | 11/1992 | Tan | 210/634 |
| 5,342,521 | 8/1994 | Bardot et al. | 210/490 |
| 5,522,995 | 6/1996 | Cockrem | 210/654 |
| 5,656,319 | 8/1997 | Barclay | 426/574 |
| 5,707,673 | 1/1998 | Prevost et al. | 426/417 |

FOREIGN PATENT DOCUMENTS

| | | | |
|---|---|---|---|
| 62129102 | 11/1985 | Japan | B01D 11/00 |
| 62158223 | 12/1985 | Japan | B01D 11/04 |
| 1189301 | 1/1988 | Japan | A23J 7/00 |
| 5068804 | 9/1991 | Japan | A23F 3/42 |
| 2190398 | 11/1987 | United Kingdom . | |
| 9206775 | 4/1992 | WIPO . | |

OTHER PUBLICATIONS

Kaiha et al, JP 62158223, Jul. 14, 1987. "Recovery of Organic Substance from an Aq. System—by Extracting with Super–critical . . . " Abstract from Database WPI, Week 3733, Derwent Publication AN 87–232797.

Kenkyush, JP 01189301, Jul 28, 1989. "Sepg. useful matter from natural substance—by combining super–critical extracting process . . . " Abstract from Database WPI, Week 8936, Derwent Publication AN 89–260219.

Koryo, JP 05068804, Mar. 23, 1993. "Sepn. by extn. with prevention of perfume component dissipation with solvent gas . . . " Abstract from Database WPI Week 9316, Derwent Publication AN 93–130718.

Hitachi, JP 62129102, Jun. 11, 1987. "Extract Sepn. Using Supercritical Gas . . . " Abstract from Database WPI Week 8729, Derwent Publication AN 87–201919.

*Primary Examiner*—Ana Fortuna
*Attorney, Agent, or Firm*—Hayes, Soloway, Hennessey, Grossman & Hage, P.C.

[57] ABSTRACT

A process and installation for the separation of heavy and light compounds is provided. According to the process, a solid or liquid phase containing the compounds to be separated is contacted with a supercritical fluid in an extractor, after which the supercritical fluid containing compounds leaving the extractor undergo nanofiltration for recovering a permeate flow containing the light compounds and a retentate flow containing the heavy compounds. The invention has particular utility for separating fats in food stuffs such as butter or fish oil.

9 Claims, 1 Drawing Sheet

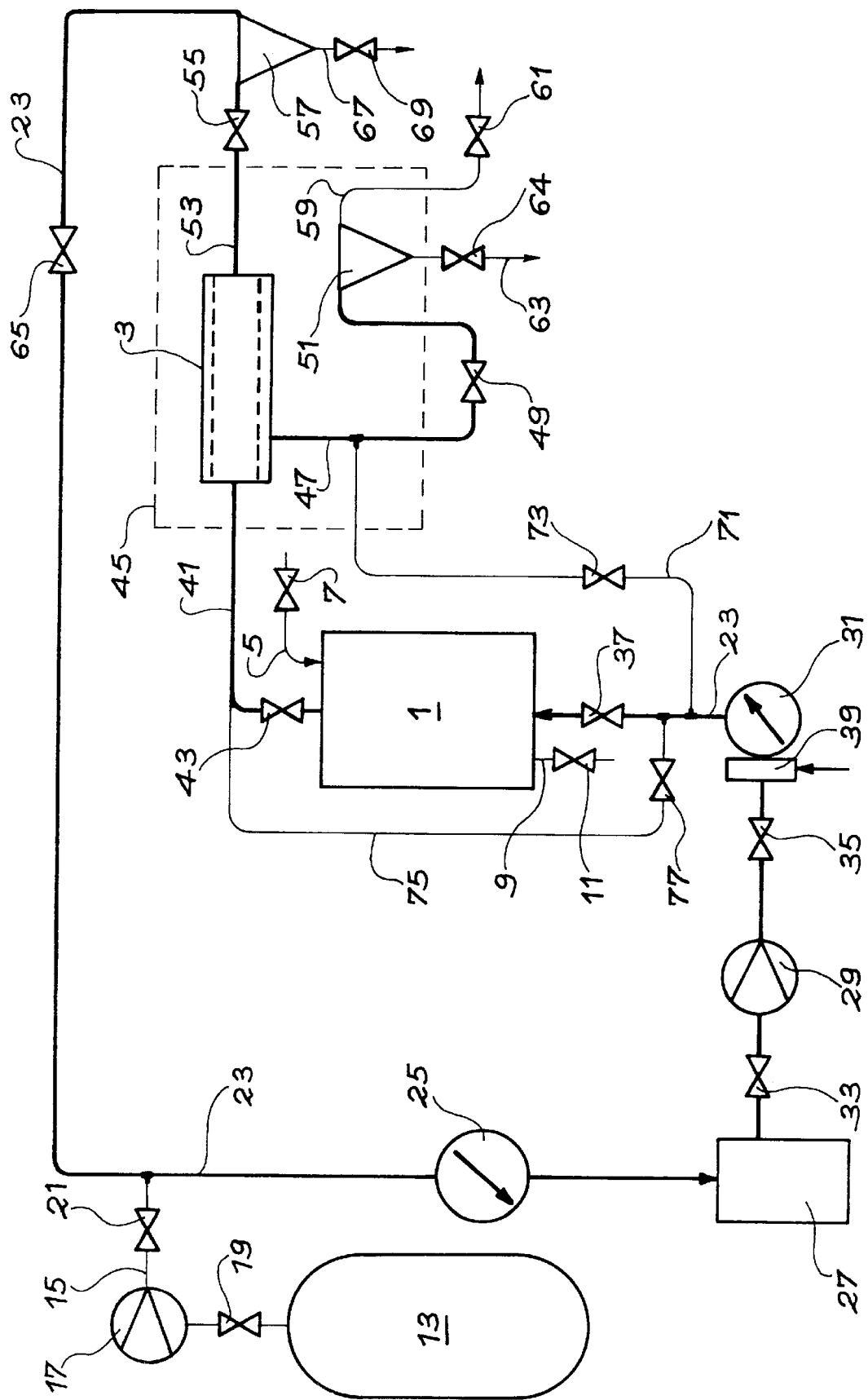

PROCESS AND INSTALLATION FOR THE SEPARATION OF HEAVY AND LIGHT COMPOUNDS BY EXTRACTION USING A SUPERCRITICAL FLUID AND NANOFILTRATION

FIELD OF THE INVENTION

The present invention relates to a process for the separation of heavy and light compounds from a solid or liquid phase containing them.

BACKGROUND OF THE INVENTION

Such a process has numerous applications in widely varying fields such as the food industry, e.g. for the fractionation of triglycerides obtained from butter or fish oil, the separation of added high value biomolecules such as vitamins, dyes and pigments, and the polymers industry for the fractionation of polymers of interest to peak industries as silicones, etc.

For all these applications, the starting products are solid or liquid phases having a complex composition requiring the use of numerous fractionation stages in order to bring about the isolation of molecules interest.

More specifically, the invention relates to the joint use of supercritical fluid extraction methods and nanofiltration methods in order to permit the extraction of molecules of interest from complex products, which has hitherto never been possible.

Thus, supercritical fluid extraction methods have hitherto been used up to now for extracting compounds of interest from solid or liquid products such as plants, e.g. for obtaining perfume extracts from various plants or for recovering the active principles, as is described in numerous documents such as the work of E. Stahl "Extraction dense gases for extraction and refining", 1987. Following the extraction operation, the extract is used as it is or it is separated by distillation processes.

Membrane separation methods have been used in various fields such as gaseous diffusion isotope separation, sea water desalination, protein separation, etc., but they have never been combined with a supercritical fluid extraction unit.

However, research has been carried out on the filtration of supercritical fluids such as $CO_2$, e.g. for separating supercritical $CO_2$ from ethanol on an asymmetrical kapton polyimide membrane (Semenova et al, 1992), and for separating $CO_2$ from polyethylene glycol 400 on $SiO_2$ or polyimide membranes (Nakamura et al, "Membrane separation of supercritical fluid mixture", pp 820–822 in Developments in Food Engineering, published by T. Yamo, R. Matsuno and K. Nakamura Blacku Academic & Professional (Chapman & Hall), London, New York, Tokyo, 1994).

Thus, no research has been carried out on the use of nanofiltration for selectively separating solutes contained in a supercritical fluid.

In nanofiltration methods, use is made of a nanofiltration membrane, which retains the substances having a molecular weight higher than the membrane cutoff threshold, which is in the molecular weight range from 50 to 1000 Daltons, but which allows the passage of substances having a molecular weight below said threshold, in order to separate substances as a function of their molecular weight. This property has never been used with supercritical fluids, because in all the studies carried out the products to be separated are retained by the membrane, even if they have a low molecular weight, such as is the case with ethanol.

BRIEF SUMMARY OF THE INVENTION

The present invention provides to a process for the separation of light and heavy compounds by the extraction of all the compounds in a supercritical fluid, followed by a separation on a nanofiltration membrane. According to the invention, the process for separating at least one light compound having a molecular weight from 50 to 1000 Daltons, from at least one heavy compound having a higher molecular weight than that of the light compound, starting from a solid or liquid phase containing them, is characterized in that it comprises the following steps in sequence:

a) contacting said solid or liquid phase with a supercritical fluid at a pressure $P_1$ higher than the critical pressure $P_c$ of the fluid and at a temperature $T_1$ higher than the critical temperature $T_c$ of the fluid, in order to extract therein the light and heavy compounds, b) subjecting the supercritical fluid which has extracted the compounds to a filtration on a nanofiltration membrane, by applying from the other side of the membrane a pressure $P_2$ lower than $P_1$, but higher than $P_c$, in order to subdivide the supercritical fluid into a light compound-depleted retentate flow and a permeate flow constituted by a light compound-enriched supercritical fluids and c) recovering the light compound or compounds from the permeate flow.

In this process, thus there is firstly an extraction of the light and heavy compounds in a supercritical fluid, thus taking advantage of the improved solvent power of supercritical fluids, followed by the separation of similar compounds extracted in said fluid as a function of their molecular weight by nanofiltration through a membrane having appropriate characteristics for said separation.

The joint use of these two methods permits an increased selectivity and the separation of compounds having a similar structure and molecular weight.

Compared with simple separation by a nanofiltration membrane, the use of a supercritical fluid as the vector fluid of compounds to be separated permits an improvement of the transmembrane transfer and better separation performance characteristics. Moreover, the fact of combining a nanofiltration-based separation with a supercritical fluid-based extraction leads to a by no means negligible energy gain.

Thus, in supercritical fluid-based extraction processes, it is necessary at the end of the operation to perform an expansion of all the fluid used for the extraction purposes in order to separate it in the gaseous state from the extracted products which remain in the liquid state. This involves significant energy costs, because it is then necessary to recompress all the supercritical fluid used for recycling the same in the extraction installation. In the invention, by associating with the extraction process a nanofiltration separation, it is possible to recover the product of interest present in the permeate, by only subjecting to the expansion a fraction of the supercritical fluid used for the separation.

For the performance of the process according to the invention, it is possible to use various supercritical fluids such as $CO_2$, $N_2O$, $NO_2$, $C_1$ to $C_6$ light alkanes, CFC's or CFC substitutes, rare gases, ammonia, $C_1$ to $C_4$ light alcohols, $SF_6$, either in the pure or mixed state.

In certain cases, it is necessary to add to the supercritical fluid a cosolvent, which improves the solvent quantities. As the solvent, it is possible to use water and light $C_1$ to $C_6$ alcohols with contents between 0 and 10%.

Preferably, use is made of supercritical $CO_2$, which has the advantage of a critical temperature Tc and a critical pressure Pc which are not very high (31° C. and 7.3 MPa).

In the case where the supercritical fluid is constituted by supercritical $CO_2$, the pressure $P_1$ advantageously has a value between 7.3 and 35 MPa and the temperature $T_1$ advantageously has a value between 31 and 120° C.

Preferably, $P_1$ exceeds 10 MPa in order to obtain a higher extraction yield due to the improved solvent power of the fluid at high pressures.

In the nanofiltration separation stage, a pressure $P_2$ lower than $P_1$, but higher than $P_c$ is applied, which is chosen as a function of the compounds to be separated, so as to have a high selectivity of the light compounds compared with the heavy compounds. Generally, the pressure $P_2$ is such that $(P_1-P_2)$ is in the range 1 to 5 MPa.

In order to recover the light compounds from the permeate flow, it is possible to carry out an expansion of said permeate flow at a pressure $P_3$ lower than $P_c$ in order to eliminate the supercritical fluid in the gaseous state and separate it from the light compound or compounds remaining in the liquid state.

The nanofiltration membranes used in the process according to the invention can be of different types, provided that they have a cutoff threshold in the molecular weight range 50 to 1000 Daltons.

These membranes can be organic, mineral or organomineral and must have a "global" resistance (mechanical, thermal, structural, chemical) appropriate for the particular medium of the supercritical fluid used.

Organomineral membranes are composite asymmetrical nanofilters having an inorganic material, macroporous support, e.g. of alumina, coated with an active, organic material layer such as a polymer, with the optional interposing between said support and said active layer of an inorganic material, mesoporous layer, e.g. of $TiO_2$. Organomineral membranes of this type are described in WO-A-92/06775.

Such membranes comprise a porous, inorganic substance support covered on one face by a first, mesoporous, inorganic material layer having a mean pore radius below 10 nm and a second active layer placed on the first mesoporous layer and having a thickness of 0.1 to 1 $\mu m$, made from organomineral polymer or organic polymer chosen from within the group including sulphonated polysulphones, polybenzimidazonones, polyvinylidene fluorides grafted by diaminoethyl methacrylate and perfluorinated ionomers.

Preference is given to organomineral membranes having an $Al_2O_3\alpha$ macro-porous support, covered with a mesoporous, titanium dioxide layer and a perfluorinated ionomer layer such as of Nafion® because they have a supercritical $CO_2$ permeability high enough to obtain a relatively large permeate flow.

The invention also relates to an installation for performing the process described hereinbefore and comprising:

an extractor able to receive a solid or liquid phase containing the compounds to be extracted, a nanofiltration device having at least one nanofiltration membrane, means for making a supercritical fluid successively circulate in the extractor and in the nanofiltration device, means for recovering at the outlet of the nanofiltration device a permeate flow containing part of the extracted compounds and a retentate flow containing the other part of the extracted compounds, means for separating from the retentate flow the totally or partly extracted products and recycling into the extractor the supercritical fluid in the pure state or charged with a residual part of the dissolved compounds and means for separating the extracted products from the permeate flow.

Other features and advantages of the invention can be better gathered from the study of the following non-limitative, illustrative description with reference to the attached drawing, which is a diagrammatic representation of an installation for performing the process according to the invention.

BRIEF DESCRIPTION OF THE FIGURE

The drawing is a schematic diagram of the combination of equipment and material flow of a preferred embodiment of the invention. With reference to said FIGURE, it can be seen that the installation for performing the process according to the invention comprises as its main components the extractor (1) and the nanofiltration module (3).

DETAILED DESCRIPTION OF THE PREFERRED EMBODIMENT

It is possible to introduce into the extractor (1) the solid or liquid phase constituting the starting product of the process according to the invention, using a pipe (5) equipped with a valve (7), whereby the residual products can be eliminated at the end of the operation by the pipe (9) equipped with a valve (11).

The supercritical fluid can be introduced into the extractor (1) from a storage tank (13) by means of the pipe (15) equipped with a pump (17) and two valves (19) and (21), in a circuit (23) having a first heat exchanger (25), a buffer volume (27), a second pump (29), a second heat exchanger (31) and valves (33, 35 and 37). On said supercritical fluid supply circuit is also provided an injector (39) upstream of the second exchanger (31).

On leaving the extractor (1), the supercritical fluid which has extracted the heavy and light compounds passes out by means of a pipe (41) equipped with a valve (43) and is then directed into the nanofiltration module (3) kept at the desired temperature by an oven (45). In said nanofiltration module, the supply of fluid containing light and heavy compounds is subdivided into a permeate flow which has traversed the nanofiltration membranes and which is discharged by the pipe (47) equipped with the expansion valve (49) to a separator (51), and a retentate flow discharged by the pipe (53) equipped with the expansion valve (55) to a separator (57).

In the first separator (51) separation takes place of the supercritical permeate flow into a fluid in the gaseous state discharged by the pipe (59) equipped with an expansion valve (61), and a liquid product corresponding to the light compound or compounds and which is discharged by the pipe (63) equipped with a valve (64).

In the separator (57) the supercritical retentate flow is separated into a fluid in the gaseous or supercritical state, which is recycled into the gaseous or supercritical fluid supply circuit (23) equipped with the valve (65) and heavy compound or compounds discharged by the pipe (67) equipped with a valve (69).

This installation also comprises a pipe (71) equipped with a valve (73) for bringing to the desired pressure the permeate circuit, as well as a pipe (75) equipped with a valve (77) for regenerating the nanofiltration module without passing into the extractor (1).

In this installation, there is a circuit operating at a high pressure between the pump (29) and the nanofiltration module (3), lower pressure circuits corresponding to the permeate flow (47) and medium or low pressure circuits corresponding to the retentate circuit (53) and to the circuit (23) in its recycling part and its supply part to the pump (29).

The nanofiltration module (3) used in this installation can have several nanofiltration membranes.

Generally, use is made of tubular membranes assembled in grouped manner between two support plates, the active layer of said membranes being the inner layer and the supercritical fluid is made to circulate at the pressure $P_1$ within the tubular membranes.

This installation functions as follows. The solid or liquid phase to be treated is introduced by pipe (5) into the extractor (1). After closing the valve (7), with the valves (37, 43, 49 and 55) closed, the valves (33, 35, 73 and 77) are opened and the fluid from the tank (13), e.g. $CO_2$, is made to circulate in the liquid state in pipe (23) up to the pump (29), where it is compressed to the desired pressure $P_2$ on the permeate side, so as to permit a rapid balancing of the pressures on either side of the nanofiltration module membranes. When the pressure $P_2$ is reached, the valve (73) is closed and the pressure is raised in the pipe (75) until the value $P_1$ is reached, in order to create the pressure difference necessary for the satisfactory operation of the nanofiltration module.

When the pressure rise is completed, the valve (77) is closed and the valves (37, 43, 49, 55, 61 and 65) opened in order to bring about a circulation of the supercritical fluid into the extractor (1) and then into the nanofiltration module (3). This gives a fractionation of the charged fluid passing out of the extractor (1) into a permeate flow, whose light compounds are separated in the separator (51), the carbon dioxide gas being discharged in the gaseous state, and a retentate flow separated in the separator (57) into heavy compounds and $CO_2$ recycled into the circuit (23).

At the end of the operation, the extractor is isolated by closing the valves (37) and (43) and the valve (77) is opened in order to bring about a pure $CO_2$ circulation on the membrane in order to regenerate it.

A carbon dioxide gas top-up is introduced into the supply circuit (23) of the extractor (1) by the pipe (15) by appropriately regulating the opening of the valves (19 and 21) and the pump (17), as a function of the carbon dioxide gas discharged into the atmosphere by the pipe (59).

In this installation, the oven (45) permits the maintaining of the nanofiltration module at the temperature $T_1$ (31 to 120° C.) and the pump (29) leads to a $CO_2$ flow at a rate of 5 to 30 kg/h. The exchanger (31) brings the temperature of the fluid to $T_1$, the exchanger (25) only ensuring a preheating to a temperature below $T_1$, e.g. 10° C.

It is obviously possible to take samples on the pipes (63) and (69) with a view to analyzing the products obtained. If necessary, it is also possible to recycle the products collected in pipes (63) and (69) to the extractor (1) by a not shown, thermostatically controlled pipe system, by introducing them via the injector (39). It is also possible to introduce via the injector (39) other products, e.g. a cosolvent should this prove necessary.

In order to check the performance characteristics of said installation, there is a determination of the permeabilities of the nanofiltration membrane and the products collected in the separators (51) and (57) are analyzed. The pure $CO_2$ permeability can be determined on the basis of flow rate measurements performed with the aid of a gas counter and a chronometer on the permeate circuit.

In operation, it is possible to carry out the same permeability measurement, every 15 min, throughout the operation.

The analysis of the products collected in 63 and 67 can e.g. take place by chromatography in order to determine the weight of the collected product.

It is thus possible to deduce therefrom the retention rate $R_c(\%)$ of the membrane for a compound and which is expressed by the following formula:

$$R_c(\%)=[1-(C_{pc}/C_{rc}]\times 100$$

in which Cpc represents the weight ratio of compound c in the permeate to the $CO_2$ weight having traversed the membrane and expressed in g of compound/kg of $CO_2$ and $C_{rc}$ represents the weight ratio of the compound c in the retentate, i.e. the ratio of the weight of the compound c in the retentate to the weight of $CO_2$ which has entered the nanofiltration module.

On the basis of these analyses, it is also possible to determine the selectivity factor $\alpha$, which evaluates the separation efficiency of a compound $c_1$ compared with a compound $c_2$. It is determined on the basis of the following formula:

$$\alpha_{c1}/c_2=(C_{pc1}/C_{pc2})/(C_{rc1}/C_{rc2}).$$

When this factor exceeds unity, it means that the permeate has been enriched with compound $c_1$ and that consequently there is a preferential passage of said compound through the membrane.

The following examples illustrate the results obtained when performing the process according to the invention. In all these examples, $CO_2$ is used as the supercritical fluid and there is a nanofiltration module with tubular organomineral membranes with a length of 15.5 cm, an internal diameter of 0.7 cm and an external diameter of 0.8 cm. They have an $Al_2O_3\alpha$ support, a mesoporous, titanium dioxide layer and an outer, active final layer of Nafion®. The three membranes used TN 261, TN 288, TN 292 have the following characteristics:

1 mm thick, $\alpha$-alumina support,

1 $\mu$m thick $TiO_2$ underlayer, 0.1 $\mu$m thick Nafion active layer.

In the examples to be described hereinafter, a study is made of the performance characteristics of the process according to the invention on polyethylene glycols. These polyethylene glycols PEG's have the general formula H—(OCH$_2$—CH$_2$)$_n$—OH and their molecular weights are a function of the degree of polymerization n. These examples use PEG's having respective molecular weights (Mw) 200 (PEG 200), 400 (PEG 400) and 600 Daltons (PEG 600) or ethylene glycol.

The characteristics of these products are given in the following table 1.

In order to carry out this separation, into the extractor (1) are introduced 200 or 300 g of products to be separated in a stationary, top-up phase constituted by diatomaceous silica representing ⅓ of the PEG mixture, i.e. 300 g of PEG mixture and 150 g of dicalcite or 200 g of mixture and 100 g of dicalcite. In the case of the mixture containing PEG 600, the latter is preferably melted in the water bath at 50° C.

EXAMPLES

EXAMPLES 1 to 3

Study of the Composition of the Mixture of Two Polyethylene Glycols with Different Molecular Weights Entering the Membrane The nanofiltration membrane is constituted by membrane TN 261 and extraction takes place by circulating the supercritical $CO_2$ at a pressure $P_1$ and temperature $T_1$ given in the following table 2, maintaining a pressure difference ($P_1-P_2$) between the retentate side $P_1$ and the permeate side $P_2$ of 3 MPa.

Initially determination takes place of the composition of the extract contained in $CO_2$ entering the membrane, as a function of $P_1$ and $T_1$.

The results obtained are also given in table 2. They make it possible to optimize the temperature $T_1$ and pressure $P_1$ conditions so that the composition of the extract extracted is perfectly known and relatively well balanced in PEG 200 and 600.

EXAMPLES 4 to 7

Ethylene Glycol-Polyethylene Glycol 400 Separation

These examples follow the same operating procedure as in example 1 with membrane TN 288 and extraction takes place at a temperature $T_1$ of 60° C. and a pressure $P_1$ of 31 MPa. A pressure $P_2$, varying between 27 and 30 MPa is applied from the other side of the nanofiltration membrane. The results obtained are given in table 3.

The results of table 3 show that the $\alpha_{EG/PEG}400$ selectivity is dependent on the pressure difference $P_1-P_2$. Thus, for a pressure difference of 1 MPa, the ethylene glycol traverses the membrane more easily than PEG, the permeate then being richer in ethylene glycol than the retentate. Conversely, as from a pressure difference of 2 MPa, the selectivity is close to unity, so that the membrane has not served as a selective barrier, because it has the same permeability for both solutes. This is due to the fact that the two compounds have a low molecular weight compared with the membrane retention possibilities (threshold 500 to 1000 Daltons).

EXAMPLES 8 to 11

Separation of Polyethylene Glycol 200 and 600 Mixtures

These examples use as the nanofiltration membrane membrane TN 261 operating at a pressure $P_1$ of 31 MPa and a temperature $T_1$ of 60° C. with a pressure difference $P_1-P_2$ varying between 1 and 4 MPa.

As hereinbefore, determination takes place of the compound quantities recovered in the permeate and retentate, as well as the compound weight ratios in the permeate Cp, in the retentate Cr, the retention level R and the PEG 200/PEG 600 $\alpha$ selectivity. The results obtained are given in table 4, showing that the optimum selectivity (highest $\alpha$) is between 2 and 3 MPa of $\Delta p$.

Examples 12 to 15

These examples follow the operating procedure of examples 8 to 11, but the nanofiltration membrane is TN 288, with the application of a pressure difference $P_1-P_2$ between 1 and 4 MPa. The results obtained are given in table 5.

The results of tables 4 and 5 show that the enrichment factor increases with the pressure difference applied up to a limit value of 4 MPa, the optimum being obtained for a pressure difference of 2 MPa for membrane TN 288 and 3 MPa for membrane TN 261. For a 4 MPa pressure difference, it would appear that the motive force applied is excessive and leads to a forced passage of the two compounds into the permeate flow. It is therefore important to limit the pressure difference $P_1-P_2$ to a low value in order to obtain an optimum separation.

Example 16

Fractionation of Triglycerides

In this example butter is treated in order to fractionate the triglycerides thereof.

It is known that there is a considerable industrial demand for the production of lipid and cholesterol-depleted products.

Butter is an oil emulsion in water, whose mean composition is as follows:

proteins: 0.7 to 1% lipids: 81 to 83% carbohydrates: 0.3 to 1% mineral salts: 0.1 to 0.3% water 15 to 17%.

The lipids of the butter are essentially constituted by triglycerides (97.5 wt.%), the cholesterol representing 0.31 wt.%. Triglycerides are formed from fatty acids containing between 4 and 54 carbon atoms, 75% of which are saturated and form long-chain fatty acids, mainly palmitic acid (20 to 30%) and stearic acid (10%), and short-chain fatty acids with 4 to 10 carbon atoms (10%), ⅓ being butyric acid. Butter also contains cholesterol at a concentration of 250 mg/100 g. According to the invention, extraction takes place of the butter triglycerides by supercritical CGO at a pressure $P_{of}$ 31 MPa, a temperature $T_1$ of 40° C. and a pressure $P_2$ of 28 MPa. For extraction purposes, introduction takes place into the extractor (1) of 200 g of butter and 60 g of diatomaceous silica and extraction is carried out, followed by the separation on the nanofiltration membrane for 1 h, with a $CO_2$ supply rate of 20 kg/h using membrane TN 292 as the nanofiltration membrane.

At the end of the operation analysis takes place of the extracts recovered in the separators (51 and 57) by gas chromatography. For this purpose, the extracts are melted using a water bath and are then centrifuged for 10 min at 2500 r.p.m., followed by the elimination of the white deposit and the collection of the anhydrous extract. 300 mg of anhydrous extract are then dissolved in 1 ml of isooctane, followed by the injection of 1 ml of solution into the vector gas (hydrogen) of a gas chromatograph having a type C18 capillary column and the separated products are detected by means of a flame ionization detector.

The results obtained on the retentate and permeate and given in table 6. Table 6 also gives the $\beta$ ratio corresponding to the ratio of the considered triglyceride in the permeate to the same triglyceride in the retentate. When $\beta$ is below 1, the triglyceride is retained by the membrane.

The results of table 6 show that the $\beta$ ratio is higher than 1 for triglycerides below C40, this group of compounds also including cholesterol.

EXAMPLE 18

Separation of Triglycerides in Fish Oil

Fish oil is mainly constituted by triglycerides containing fatty acids with a different chain length and degree of saturation, but with 75 to 90% saturated fatty acids. This animal oil is very rich in very long fatty acids (more than 18 carbon atoms), some being saturated and others very unsaturated. The latter ($\omega$ 3 fatty acids) would have favourable effects on the human health. This is particularly the case with eicosapentaeonoic acid (C20:5) or EPA and docosahexanoic acid (C22:6) or DHA, which lead to a limitation of thrombocyte aggregation and lower the lipoprotein level so as to prevent cardiovascular diseases.

It is therefore of interest to obtain from fish oil a fraction rich in long-chain triglycerides containing EPA and DHA.

In order to extract triglycerides from fish oil, the same conditions as in example 16 are used with the same nanofiltration membrane. The results obtained are given in table 7.

The beta ratio is higher than unity up to C54, i.e. higher than C54 triglycerides have difficulty in passing through the membrane.

Thus, this process makes it possible to separate fish oil into a heavy triglyceride fraction, whose carbon number is 54 to 62, operating in the following way. Starting with 20 kg of fish oil containing 50% (10 kg) heavy fraction, after one hour of treatment 0.5 kg of permeate containing 45% (0.225 kg) heavy fraction and 15 kg of retentate containing 58% (8.7 kg) of the same fraction are obtained. The membrane surface necessary for this operation is 0.3 m², i.e. 1.5 times the exchange surface of a commercial multichannel membrane.

TABLE 1

| Products | kinematic viscosity at 98.9° C. (Stokes) | Melting point (° C.) |
|---|---|---|
| Ethylene glycol (Mw = 62.07 Daltons) | | |
| PEG 200 | 0.043 | −65 |
| PEG 400 | 0.073 | −6 |
| PEG 600 | 0.105 | 22 |

TABLE 2

| Ex | Compounds | Charge | Entering extract composition (%) | $P_1$ (MPa) | $T_1$ (° C.) |
|---|---|---|---|---|---|
| 1 | PEG 200 | 100 g | 100 | 21 | 80 |
|   | PEG 600 | 100 g | 0 | | |
| 2 | PEG 200 | 100 g | 80.7 | 21 | 60 |
|   | PEG 600 | 200 g | 18.9 | | |
| 3 | PEG 200 | 100 g | 56.3 | 31 | 60 |
|   | PEG 600 | 200 g | 43.7 | | |

TABLE 3

| Ex | $P_1-P_2$ (MPa) | Compounds | Extraction yield (wt. %) | Permeate extract (g) | Retention extract (g) | Cp (g·kg⁻¹) | Cr (g·kg⁻¹) | R (%) | α EG/PEG400 (−) |
|---|---|---|---|---|---|---|---|---|---|
| 4 | 1 | EG | 0.32 | 3.1 | 69.08 | 2.49 | 3.11 | 19.9 | 1.4 |
|   |   | PEG 400 | 0.32 | 2.2 | 68 | 1.75 | 3.06 | 42.8 | |
| 5 | 2 | EG | 0.38 | 2.8 | 80 | 2.91 | 3.67 | 20.7 | 1 |
|   |   | PEG 400 | 0.36 | 2.7 | 76.5 | 2.82 | 3.51 | 19.7 | |
| 6 | 3 | EG | 0.35 | 4.72 | 72.4 | 2.59 | 3.32 | 22 | 1 |
|   |   | PEG 400 | 0.30 | 4.19 | 61.06 | 2.30 | 2.80 | 17.9 | |
| 7 | 4 | EG | 0.43 | 9.51 | 61.24 | 3.16 | 3.8 | 16.3 | 1 |
|   |   | PEG 400 | 0.35 | 7.25 | 48.83 | 2.41 | 3.03 | 20.5 | |

TABLE 4

| Ex | $P_1-P_2$ (MPa) | Compounds | Extraction yield (wt. %) | Permeate extract (g) | Retentate extract (g) | Cp (g·kg⁻¹) | Cr (g·kg⁻¹) | R (%) | α PEG200/600 (−) |
|---|---|---|---|---|---|---|---|---|---|
| 8 | 1 | PEG 200 | 0.32 | 1.18 | 95.09 | 3.17 | 3.14 | 0 | 1.1 |
|   |   | PEG 600 | 0.27 | 0.91 | 80.24 | 2.44 | 2.65 | 8 | |
| 9 | 2 | PEG 200 | 0.35 | 2 | 87.22 | 5 | 3.38 | 0 | |
|   |   | PEG 600 | 0.33 | 1.2 | 83.87 | 3 | 3.25 | 7.7 | 1.6 |
| 10 | 3 | PEG 200 | 0.28 | 2.37 | 67.12 | 2.73 | 2.70 | 0 | |
|   |   | PEG 600 | 0.23 | 1.33 | 55.79 | 1.53 | 2.22 | 31.1 | 1.5 |
| 11 | 4 | PEG 200 | 0.34 | 4.82 | 82.27 | 4.02 | 3.23 | 0 | |
|   |   | PEG 600 | 0.25 | 2.68 | 61.89 | 2.23 | 2.43 | 8.2 | 1.35 |

TABLE 5

| Ex | $P_1-P_2$ (MPa) | Compounds | Extraction yield (wt. %) | Permeate extract (g) | Retentate extract (g) | Cp (g·kg⁻¹) | Cr (g·kg⁻¹) | R (%) | α PEG200/600 (−) |
|---|---|---|---|---|---|---|---|---|---|
| 12 | 1 | PEG 200 | 0.3 | 1.35 | 86.39 | 2.27 | 2.95 | 23.1 | 1.2 |
|   |   | PEG 600 | 0.15 | 0.55 | 43.93 | 0.93 | 1.5 | 38 | |
| 13 | 2 | PEG 200 | 0.3 | 2.1 | 54.43 | 1.78 | 2.89 | 38.4 | 1.4 |
|   |   | PEG 600 | 0.18 | 0.9 | 32.77 | 0.76 | 1.74 | 56.3 | |
| 14 | 3 | PEG 200 | 0.32 | 1.98 | 58.25 | 2.2 | 3.1 | 42.9 | 1.4 |
|   |   | PEG 600 | 0.21 | 0.94 | 38.9 | 1.04 | 2.07 | 49.8 | |

TABLE 5-continued

| Ex | $P_1-P_2$ (MPa) | Compounds | Extraction yield (wt. %) | Permeate extract (g) | Retentate extract (g) | Cp (g·kg$^{-1}$) | Cr (g·kg$^{-1}$) | R (%) | α PEG200/600 (—) |
|---|---|---|---|---|---|---|---|---|---|
| 15 | 4 | PEG 200 | 0.34 | 3.23 | 89.1 | 2.69 | 3.31 | 18.7 | 1 |
|    |   | PEG 600 | 0.32 | 2.92 | 82.64 | 2.43 | 3.07 | 20.8 |   |

TABLE 6

| Permeate extract (g) | Retention extract (g) | Triglycerides: number of carbon atoms | Permeate composition (%) | Retentate composition (%) | β |
|---|---|---|---|---|---|
| 10.4 | 147.7 | 28 | 1.12 | 0.85 | 1.32 |
|      |       | 30 | 1.60 | 1.38 | 1.16 |
|      |       | 32 | 3.19 | 2.75 | 1.16 |
|      |       | 34 | 12.12 | 11.29 | 1.07 |
|      |       | 36 | 15.71 | 14.62 | 1.07 |
|      |       | 38 | 12.68 | 12.91 | 0.98 |
|      |       | 40 | 10.25 | 10.26 | 1.00 |
|      |       | 42 | 5.68 | 5.76 | 0.99 |
|      |       | 44 | 7.06 | 7.42 | 0.95 |
|      |       | 46 | 7.20 | 8.23 | 0.87 |
|      |       | 48 | 9.20 | 9.62 | 0.96 |
|      |       | 50 | 7.16 | 7.87 | 0.91 |
|      |       | 52 | 3.25 | 3.45 | 0.94 |
|      |       | 54 | 3.45 | 3.49 | 0.99 |

TABLE 7

| Permeate extract (g) | Retention extract (g) | Triglycerides: number of carbon atoms | Permeate composition (%) | Retentate composition (%) | β |
|---|---|---|---|---|---|
| 4.2 | 146.7 | 36 | 0.90 | 0.04 | 22.50 |
|     |       | 38 | 1.20 | 0.39 | 3.08 |
|     |       | 40 | 1.08 | 0.57 | 1.89 |
|     |       | 42 | 1.49 | 0.50 | 2.98 |
|     |       | 44 | 2.59 | 0.80 | 3.24 |
|     |       | 46 | 4.92 | 1.87 | 2.63 |
|     |       | 48 | 9.65 | 7.44 | 1.30 |
|     |       | 50 | 17.85 | 15.56 | 1.15 |
|     |       | 52 | 22.38 | 21.29 | 1.05 |
|     |       | 54 | 24.02 | 22.82 | 1.05 |
|     |       | 56 | 8.29 | 17.86 | 0.46 |
|     |       | 58 | 3.96 | 8.69 | 0.46 |
|     |       | 60 | 1.13 | 1.99 | 0.57 |
|     |       | 62 | 0.01 | 0.05 | 0.20 |

We claim:

1. Process for separately recovering at least one light compound having a molecular weight from 50 to 1000 Daltons, and at least one heavy compound having a higher molecular weight than that of the light compound, from a solid or liquid phase containing both heavy and light compounds, comprising the steps in sequence of:
   a) contacting said solid or liquid phase with a supercritical fluid at a pressure $P_1$ higher than the critical pressure $P_c$ of the fluid and at a temperature $T_1$ higher than the critical temperature $T_c$ of said fluid whereby to produce a supercritical extraction-fluid containing heavy and light compounds,
   b) subjecting the supercritical extraction fluid of step a) to filtration through a nanofiltration membrane by directing said supercritical extraction fluid to one side of the membrane while applying to the other side of the membrane a pressure $P_2$ lower than $P_1$ and higher than $P_c$, in order to separate the supercritical extraction-fluid into a light compound-depleted retentate flow and a permeate flow constituted by light compound-enriched supercritical fluid,
   c) recovering light compounds from the permeate flow, and
   d) recovering heavy compounds from the retentate flow.

2. Process according to claim 1, wherein the supercritical fluid comprises supercritical $CO_2$.

3. Process according to claim 2, $P_1$ has a value of from 7.3 to 35 MPa, and $T_1$ a value of from 31 to 120° C.

4. Process according to claim 2, wherein $P_1-P_2$ is in the range of 1 to 5 MPa.

5. Process according to claim 2, wherein the light and heavy compounds comprise polyethylene glycols with different molecular weights.

6. Process according to claim 2, wherein the starting phase comprises butter or a fish oil, and the compounds to be fractionated comprise long-chain fatty acids or triglycerides.

7. Process according to claim 1, wherein the at least one light compound is recovered from the permeate flow by expansion at a pressure $P_3$ below $P_c$, in order to eliminate the supercritical fluid in the gaseous state and separate it from light compounds remaining in the liquid state.

8. Process according to claim 1, wherein the nanofiltration membrane comprises an organomineral membrane having a porous, inorganic substance support coated on one face by a first inorganic material, mesoporous layer with a mean pore radius below 10 nm, and a second active layer placed on the first mesoporous layer, having a thickness of 0.1 to 1 μm and made from organomineral polymer or organic polymer selected from the group consisting of a suphonated polysulphone, a polybenzimidazone, a polyvinylidene fluoride grafted by diaminoethyl methacrylate, and a perfluorinated ionomer.

9. Apparatus for separating at least one light compound having a molecule weight from 50 to 1000 Daltons, from at least one heavy compound having a higher molecular weight than that of the light compound, from a solid or liquid phase containing them, comprising:

an extractor for receiving a solid or liquid phase containing the compounds to be extracted, a nanofiltration device having at least one nanofiltration membrane, pipes and pumps for circulating a supercritical fluid successively in the extractor and the nanofiltration device, a separator for recovering at the outlet from the nanofiltration device a permeate flow containing part of the extracted compounds and a retentate flow containing the other part of the extracted compounds, a separator for separating from the retentate flow the wholly or partly extracted products and for recycling into the extractor the supercritical fluid in the pure state or containing a residual part of the dissolved compounds, a separator for separating the extracted products from the permeate flow.

* * * * *